No. 789,930. PATENTED MAY 16, 1905.
J. F. O'DELL.
MOUSE TRAP.
APPLICATION FILED AUG. 29, 1904.
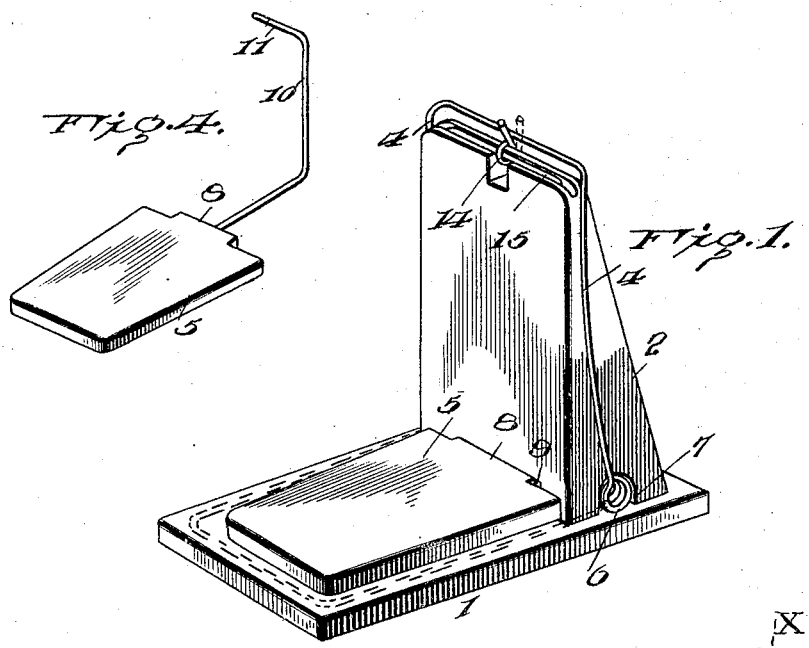
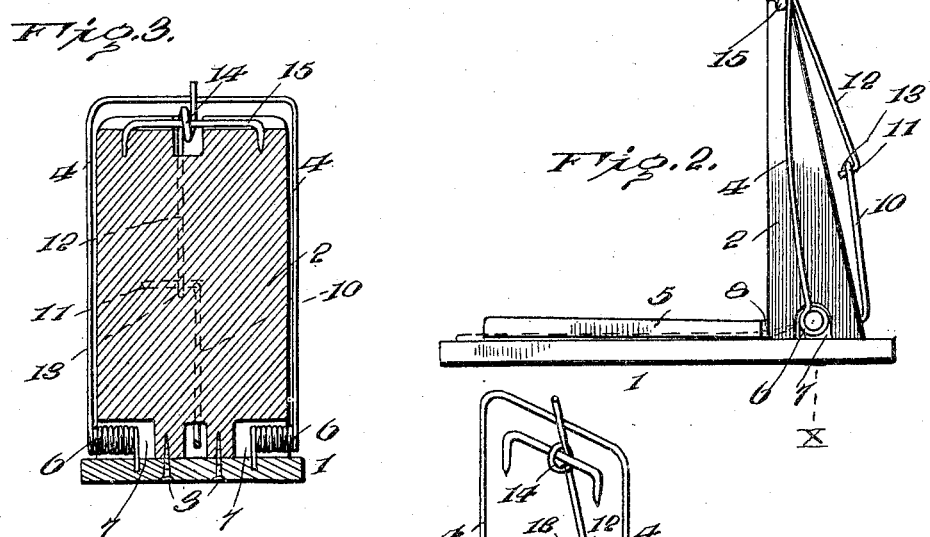

No. 789,930. Patented May 16, 1905.

UNITED STATES PATENT OFFICE.

JEFFERSON F. O'DELL, OF OIL CITY, PENNSYLVANIA.

MOUSE-TRAP.

SPECIFICATION forming part of Letters Patent No. 789,930, dated May 16, 1905.

Application filed August 29, 1904. Serial No. 222,633.

*To all whom it may concern:*

Be it known that I, JEFFERSON F. O'DELL, a citizen of the United States, residing at Oil City, in the county of Venango and State of Pennsylvania, have invented certain new and useful Improvements in Mouse-Traps, of which the following is a specification.

This invention provides a simple construction of trap especially designed for catching rodents; and the essential feature of the invention is to secure a device of this class embodying extreme simplicity of structure, whereby same may be cheaply manufactured so as to have increased desirability.

For a full description of the invention and the merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 1 is a perspective view of the invention. Fig. 2 is a side elevation, the parts of the trap being set preparatory to entrapping an animal. Fig. 3 is a vertical transverse sectional view taken on the line X X of Fig. 2. Fig. 4 is a detail perspective view of the bait or actuating platform. Fig. 5 is a perspective view of the engaging loop by which the animal is caught in the trap, the lock-bar, and the trigger-arm; the platform, base, and standard being omitted.

Corresponding and like parts are referred to in the following description and indicated in all the views of the drawings by the same reference characters.

In carrying out the invention the trap is provided with a base 1 of any suitable form, and projecting upwardly from said base is a standard 2, the latter tapering slightly toward the upper portion thereof when viewed in side elevation. The standard 2 is secured to the base 1 in any suitable manner, being preferably attached by means of fastenings 3. A pivotally-moving engaging member is utilized to catch the animal, and this member comprises a loop 4, made of stout spring-wire preferably, said loop 4 being of somewhat rectangular form, as shown in Fig. 5. The loop 4 is adapted to traverse the space above the movable platform 5, mounted upon the base, and the ends of the loop 4 are coiled to form springs 6. The springs 6 are seated in recesses 7 in the sides of the standard 2, and the extremities of the wire from which the springs 6 are formed are inserted into the base 1 for obvious purposes.

The platform 5, mentioned above, is movable toward and from the base 1 a limited distance, and an extension 8 is projected from the rear end of said platform, being received in the recess portion 9.

In the front of the standard 2 and projected from the extension 8 of the standard 2 rearwardly is a trigger-arm 10, which arm passes through the standard 2, being projected upward in rear of said standard. The trigger-arm 10 is provided with a lateral projection 11, which projection is adapted to be engaged by a lock-bar 12, pivoted between its ends to the upper portion of the standard 2. The rearmost end of the lock-bar 12 is provided with a hook 13, adapted to engage the projection 11 of the rigid trigger-arm 10 to hold the platform 5 slightly elevated from the base 1. The member 12 is held in engagement with the arm 10 by the spring-pressure of the loop 4 when the latter is thrown upwardly, so that the upper extremity thereof engages the end of the bar 12 opposite that having the hook 13. The bar 12 is suitably pivoted to the standard, being looped between its ends, as shown at 14, to receive a transverse rod 15, secured upon the upper end of the standard 2.

In operation to set the trap the loop or engaging member 4 is raised from its normal position down upon the base 1 and the front end of the lock-bar 12 is forced downwardly, so as to cause the hook 13 to engage the projection 11 of the trigger-arm 10, the platform is held elevated by the engagement of the parts 13 and 10, and suitable bait may be disposed upon the platform. The rodent in order to reach the bait will have to move into a position in the line of movement of the engaging member 4, and as soon as the platform 5 is touched the trigger-arm 10 disengages from the loop 13, releasing the lock-bar 12. The lock-bar being released, the springs 6 cause the loop 4 to be thrown downwardly toward the base, and the springs exert sufficient pressure to cause the loop to hold and strangle the rodent when it is struck thereby.

Having thus described the invention, what is claimed as new is—

In an animal-trap, the combination, of a base, a standard extended upwardly from the base, a depressible platform mounted upon one side of the standard, a trigger-arm projecting from the rear extremity of the platform and extended through the standard and upwardly in the rear thereof, a projection extending laterally from the trigger-arm, an engaging loop provided at its ends with springs received in recesses in the sides of the standard, a lock-bar pivoted to the upper portion of the standard and provided at one end with a hook to engage the projection of the trigger-arm, the opposite end of the lock-bar being adapted to engage the upper portion of the loop aforesaid.

In testimony whereof I affix my signature in presence of two witnesses.

JEFFERSON F. O'DELL. [L. S.]

Witnesses:
   Jos. W. Barr,
   C. E. Parker.